US008626627B2

(12) United States Patent
Ransom et al.

(10) Patent No.: US 8,626,627 B2
(45) Date of Patent: Jan. 7, 2014

(54) PROVIDING ONLINE PROMOTIONS THROUGH SOCIAL NETWORK PLATFORMS

(75) Inventors: Victoria Ransom, Menlo Park, CA (US); Alain Chuard, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/452,576

(22) Filed: Apr. 20, 2012

(65) Prior Publication Data
US 2013/0046839 A1 Feb. 21, 2013

Related U.S. Application Data

(63) Continuation of application No. 12/727,223, filed on Mar. 18, 2010, now Pat. No. 8,229,819, which is a continuation-in-part of application No. 12/186,052, filed on Aug. 5, 2008, now Pat. No. 8,234,193.

(60) Provisional application No. 61/033,119, filed on Mar. 3, 2008, provisional application No. 61/078,724, filed on Jul. 7, 2008, provisional application No. 61/161,224, filed on Mar. 18, 2009.

(51) Int. Cl.
*G06Q 40/00* (2012.01)
(52) U.S. Cl.
USPC .............................. 705/35; 705/14
(58) Field of Classification Search
USPC ................................ 705/14, 35–40
See application file for complete search history.

(56) References Cited

U.S. PATENT DOCUMENTS

| 8,229,819 B2 | 7/2012 | Ransom et al. |
| 8,234,193 B2 | 7/2012 | Ransom et al. |
| 2007/0150603 A1 | 6/2007 | Cruell et al. |
| 2008/0033781 A1* | 2/2008 | Peretti .............................. 705/10 |
| 2012/0271706 A1 | 10/2012 | Ransom et al. |

OTHER PUBLICATIONS

Facebook.com website, "Causes" application accessed through Facebook, http://www.new.facebook.com/home.php#/apps/application.php?sid=029b89652141bc8e06f6a198d2946f2
&refurl=http%3A%2F%2Fwww.new.facebook.com%2Fs.
php%3Fref%3Dsearch%26init%3Dq%26q%3Dcauses%26sid%3D
029689652141bc8e06f6a1918d2946f2&id=2318966938&ref=s, pp. 1-4, Sep. 19, 2008.
Facebook.com website, "Contests" application accessed through Facebook, http://www.new.facebook.com/s.php?ref=search&init=q
&q=contests+app&sid=c227b5bc1bccdb34679b62e7c8ec2659#/
apps/application.php?sid=fe6b129e5c53ba47354f3359ef794d0d
&refurl=http%3A%2F%2Fwww.new.facebook.com%2Fs.
php%3Fref%3Dsearch%26init%3Dq%26q%3Dcontests%26sid%3Df
e6b129e5c53ba47354f3359e1794d0d&id=6504751316&ref=s, pp. 1-7, Sep. 19, 2008.
"Hollywood Stock Exchange," Wikipedia the free encyclopedia, http://en.wikipedia.org/wiki/Hollywood_Stock_Exchange, Aug. 24, 2008, pp. 1-3.

* cited by examiner

*Primary Examiner* — Thu Thao Havan
(74) *Attorney, Agent, or Firm* — Fish & Richardson P.C.

(57) ABSTRACT

Systems and methods for providing online promotions integrated with social network-based platforms are disclosed. Promotion details such as rules, offered prizes, incentives and descriptions, survey questions, display banners, terms and conditions, privacy policy, and social networks to integrate the promotion with, are provided by the sponsoring organization to a server. The server generates a custom promotion application or widget for integrating with the organization's social network webpage external to social networks. A participant enters the promotion through these webpages or other links and lists friends in the social network to receive an invitation to enter the promotion. Viral features such as friend invite features, newsfeeds, minifeeds, other features that display online activities of users and people in the users' social network, notifications, requests, and other social media-based platform features to deliver messages to members of the one or more social networks further spread the word about the organization's promotion.

32 Claims, 10 Drawing Sheets

**Instructions for redeeming this offer & fine print (*)**  Text formatting guide Get 10% off any Access Trips multisport vacation (multisport destinations are: New Zealand, Costa Rica, Patagonia and El Salvador) when you purchase a full price multisport vacation from Access Trips before September 1, 2009. Only one coupon

Anticipated Retail Value of Offer [ ]

expressed in USD

Coupon Display
If you are running your campaign within Facebook or via Facebook Connect, we can print on the coupon the name, birth date, and profile picture of the person redeeming the coupon. If you would prefer that this information is not displayed on the coupon, uncheck these fields. Please note that we can only display this information if the recipient redeems your coupon within Facebook or if they are logged in to Facebook Connect.

Display on Coupon (if available)
☑ Social Network Profile Picture ☑ Full Name ☑ Date of Birth

Offer Category (max. 3)
☐ Automotive     ☐ Beauty/Fashion    ☐ Career
☐ Celebrity      ☐ Comedy            ☐ Education
☐ Financial Services ☐ Games         ☑ Health/Fitness
☐ Home Entertainment ☐ Home/Food     ☐ Kids/Toys
☐ Lifestyle      ☐ Love/Dating       ☐ Miscellaneous
☐ Movies         ☐ Music             ☐ News
☐ Pets           ☐ Retail/Shopping   ☑ Sports
☐ Technology     ☐ Teen              ☑ Travel & Culture
☐ TV

*FIG. 6B*

PROVIDING ONLINE PROMOTIONS THROUGH SOCIAL NETWORK PLATFORMS

CROSS-REFERENCES TO RELATED APPLICATIONS

This application is a continuation of U.S. patent application Ser. No. 12/727,223 entitled "PROVIDING ONLINE PROMOTIONS THROUGH SOCIAL MEDIA NETWORKS," filed Mar. 18, 2010, which is a continuation-in-part of U.S. patent application Ser. No. 12/186,052 entitled "METHOD AND SYSTEM FOR PROVIDING ONLINE PROMOTIONS THROUGH A SOCIAL NETWORK-BASED PLATFORM," filed Aug. 5, 2008, both of which are incorporated herein by reference in their entireties. This application claims the benefit of the following applications, each of which is incorporated by reference in its entirety: (1) U.S. Provisional Application No. 61/033,119, entitled "METHOD AND SYSTEM FOR PROVIDING ONLINE PROMOTIONS THROUGH A SOCIAL NETWORK-BASED PLATFORM", filed Mar. 3, 2008; (2) U.S. Provisional Application No. 61/078,724, entitled "METHOD AND SYSTEM FOR PROVIDING ONLINE PROMOTIONS THROUGH A SOCIAL NETWORK-BASED PLATFORM", filed Jul. 7, 2008; and (3) U.S. Provisional Application No. 61/161,224, entitled "METHOD AND SYSTEM FOR PROVIDING ONLINE PROMOTIONS THROUGH A SOCIAL NETWORK-BASED PLATFORM", filed Mar. 18, 2009.

FIELD OF THE INVENTION

The present invention relates generally to integrating online promotions or campaigns with social networks. More specifically, the present invention enables organizations to run promotions integrated with viral features of social networks and to access databases of social networks in conjunction with these promotions.

BACKGROUND

Social networking sites allow users to upload and share photographs and notes with friends, generate personalized newsfeeds, and monitor and interact with the activities of users' friends; and to request and establish connections with other users on the social networking site by becoming friends within the user's social network, for example.

SUMMARY

Embodiments include methods, apparatuses and computer-readable media for providing online promotion technology integrated within a social media-based platform. A self-service technology platform is described that enables individuals or organizations to run different types of promotions such as contests, sweepstakes, coupons, and giveaways that can tap into the viral features of online social networks. An organization can use this online promotion technology to run a variety of campaign or promotional formats online including but not limited to: sweepstakes; contests; instant win games; participant-generated content contests (including contests where the general public votes to determine the winner or winners); games; company-branded games (including advergames); prediction markets; product sampling; and providing coupons or discounts as a way to increase product and brand awareness, to collect consumer information, and to drive purchases. The social media-based platform provides certain viral features such as: the invite friends feature; newsfeeds; minifeeds; notifications and other requests; and indications of advertising applications on the user's social media profile page that spread the word about the promotion and organization.

Participants entering an online promotion may select names of friends within their social network to receive an invitation to enter a promotion. After participants enter the promotion, the social media-based platform may generate a newsfeed appearing on a newsfeed page of social networks of their selected friends. The newsfeed is generated if the user chooses to publish a newsfeed. This newsfeed contains not only text telling readers about the promotion, but also graphical banners promoting the brand of the organization running the promotion. Readers may click on these banners, newsfeed text, or other links to be directed to a promotion entry form. The graphical banners may include videos, artwork, or audio clips uploaded by participants of participant-generated content contests.

BRIEF DESCRIPTION OF THE DRAWINGS

FIG. 6B depicts a screen shot of a setup process where an organization can control recipient information displayed on a coupon or voucher according to one embodiment.

DETAILED DESCRIPTION

Figure 1:
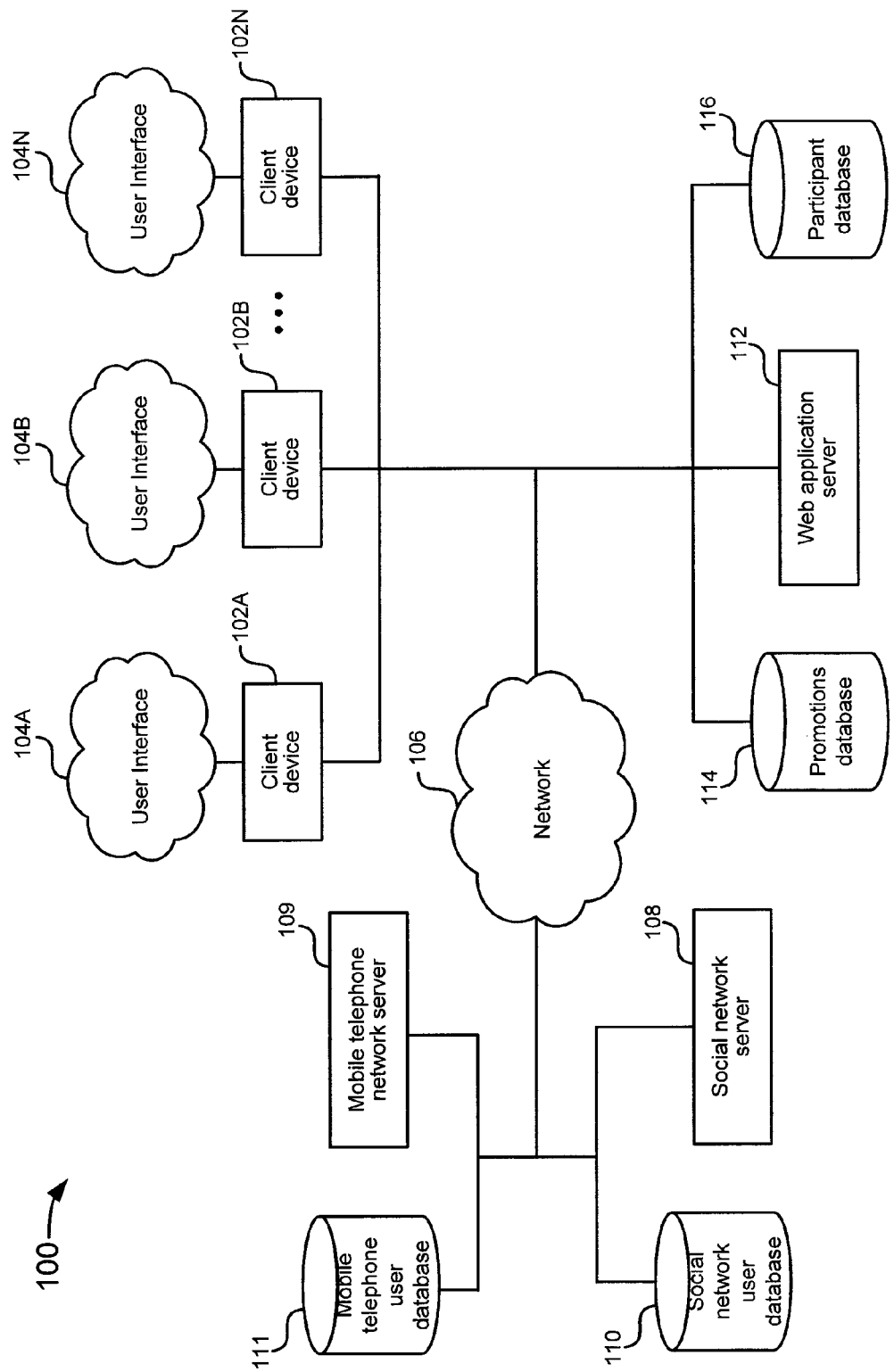
FIG. 1 depicts a block diagram of a plurality of client devices, a social network server, a mobile telephone network server, and a web application server coupled via a network according to one embodiment.

Described in detail below is a system and method of a web-based promotion technology to run an online promotion campaign integrated within social media-based platforms in order to take advantage of their viral features. Viral marketing and viral advertising refer to marketing techniques that use pre-existing social networks to produce increases in brand awareness or to achieve other marketing objectives (such as product sales) through self-replicating viral processes, analogous to the spread of pathological and computer viruses. It can be word-of-mouth delivered or enhanced by the network effects of the Internet, for example. Viral promotions may take the form of video clips, interactive Flash games, advergames, ebooks, brandable software, images, or even text messages.

The terms social media-based platform and social media network may be used interchangeably. The terms promotion and campaign may be used interchangeably. Organizations may include individuals, for-profit companies or businesses, non-profit organizations, clubs, associations, community groups, and government organizations. Organizations may also promote third party organizations' goods and services. Social media networks include, for example: social media networks such as Facebook, Twitter, MySpace, Friendster, Bebo, Orkut, Hi5, and Ning; social network aggregators that consolidate updates from social websites such as social networks, social bookmarking sites, and blog entries, that allow a user using multiple social websites to have a consolidated stream of information on all their activities across those websites, such as FriendFeed and Socialthing!; specialized social media networks, for example YouTube which is dedicated to sharing video; online virtual worlds that allow users to meet and network with other users, such as Second Life; services that allow websites external to social media networks to access social media user data, such as FriendConnect, Facebook Connect and MySpace Data Availability; and other Web 2.0 platforms that allow for making connections, sharing, and communicating through the use of viral elements.

Consumers may participate in the online promotion through one or more social media-based platforms, and the social media-based platforms' viral features are adapted to spread word of the online promotion. Viral features include, but are not limited to, invite friend features, newsfeeds, minifeeds, other features that display online activities of users and people in the users' social network, notifications, requests, other social media-based platform features that enable messages to be delivered to members of the one or more social media-based platforms, and an indication of a user's selected applications on the user's social media profile page.

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail to avoid unnecessarily obscuring the relevant description. The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Organizations have long used promotions, such as sweepstakes, contests, instant win games, participant-generated content contests (including contests where the general public votes to determine the winner or winners), quizzes, games, company-branded games (including advergames), product sampling, and coupons or discounts, as a way to increase product and/or brand awareness, collect consumer information, and drive purchases. The internet has proven to be a highly effective medium for running promotions, and many websites have used online contests and other online promotions as a way to drive traffic to their websites and to collect consumer information.

Recently, social media networks such as MySpace and Facebook have become an increasingly popular way for internet users to interact with friends and share information online. Social media users have the ability to easily share information with others in their social network. For example, social networks provide tools such as automatically generated newsfeeds and minifeeds that display the online activities of users and people in the user's social network, and simple-to-use "invite friends" features allow a social media user to easily invite friends in the user's social network to join an event or action or even invite friends not currently participating in a social network to join that social network and the event. A social media user may discover new products through the recommendations of friends within the social network. Thus, social networks have become an enormously powerful mechanism for virally spreading information about brands, products, ideas, and people.

Some organizations running online promotions have tried to tap into social networks by advertising their promotions to social media users via online banners within social networks. However, when a social media user clicks on one of these banners they are directed to the organization's website outside of the social network where they enter the promotion. While this method of advertising promotions through social networks has enabled these organizations to encourage some social media users to enter their promotion, it has not enabled them to benefit from the viral or word-of-mouth power of the social networks because users are directed outside of the social media network to interact with the promotion. For this reason, up until now, organizations running promotions have been unable to harness the full power of social networks.

Described below is a promotion technology to be integrated with participating social media-based platforms that may be used by an organization to run a customized online promotion so that the organization's promotion can tap into a number of viral features provided by the social media-based platforms including, but not limited to, friend invite feature, newsfeeds, minifeeds, other social media-based platform features that display the online activities of users and the people in their social network, notifications, requests, other social media-based platform features for delivering messages to members of the one or more social media-based platforms, and an indication of a user's selected applications on the user's social media network profile page, that can help to spread the word about the promotion in a highly efficient and cost effective way.

FIG. 1 illustrates a block diagram 100 of a plurality of client devices 102A-N with user interfaces 104A-N, a social media network server 108, a social network user database 110, a mobile telephone network server 109, a mobile telephone user database 111, a web application server 112, a participant database 116, and a promotions database 114 coupled via a network 106, according to one embodiment. More than one social network server 108, mobile telephone network server 109, social network user database 110, and mobile telephone user database 111 may be coupled to the network 106. Also, more than one web application server 112, promotions database 114, and participant database 116 may be coupled to the network 106. Only one of each is shown in FIG. 1 for clarity.

The plurality of client devices 102A-N may be any system, device, and/or any combination of devices/systems that are able to establish a connection with another device, a server and/or other systems. The client devices 102A-N typically include display or other output functionalities to present data exchanged between the device and a user. For example, the client devices may be, but are not limited to, a server, a desktop computer, a computer cluster, a mobile computing device such as a notebook, a laptop computer, a handheld computer, a mobile phone, a smart phone, a PDA, a BlackBerry™ device, and/or an iPhone, etc. In particular, the Google Android software platform allows developers to write software applications to integrate third party applications with users of mobile devices, and Apple also allows third party applications developers access to the iPhone platform. In one embodiment, client devices 102A-N are each coupled to the network 106. In some embodiments, the client devices may be directly connected to one another.

The network 106, to which the client devices 102A-N are coupled, may be a telephonic network, an open network, such as the internet, or a private network, such as an intranet and/or the extranet. The network 106 may be any collection of distinct networks operating wholly or partially in conjunction to provide connectivity to the client devices and servers, and may appear as one or more networks to the serviced systems and devices. In one embodiment, communications may be achieved by a secure communications protocol, such as secure sockets layer (SSL), or transport layer security (TLS). In one embodiment, communications may be achieved via one or more wireless networks.

The client devices 102A-N may be coupled to the network, for example, the internet, via a dial-up connection, a digital subscriber loop (DSL, ADSL), cable modem, and/or other types of connection. Thus, the client devices 102A-N may communicate with remote servers (e.g., web server, host server, mail server, and instant messaging server) that provide access to user interfaces of the World Wide Web via a web browser, for example.

The user databases 110, 111, promotions database 114, and participant database 116 may store information such as software, descriptive data, images, system information, drivers, and/or any other data item utilized by parts of the social network server 108, the mobile telephone network server 109, and/or the web application server 112 for operation. User databases 110, 111, promotions database 114, and participant database 116 may be managed by a database management system (DBMS), for example but not limited to, Oracle, DB2, Microsoft Access, Microsoft SQL Server, PostgreSQL, MySQL, FileMaker, etc. An example set of data to be stored in the social network user database 110, participant database 116, and promotions database 114 is further illustrated in FIGS. 3A-3C.

The social network server 108 may be any combination of software agents and/or hardware modules for establishing a social media-based platform for users. The social network server 108 may facilitate interaction and communication among users of the client devices 102A-N, with the web application server 112, or with other related applications and/or systems via the network 106. For example, the social network server 108 may provide a platform for users of the client devices 102A-N who are members of the social network to upload photos and notes to share with other users of client devices 102A-N who are also members of the same social network. In one embodiment, the social network server 108 may facilitate sharing of information about news and activities of members of the social network with other members designated as friends within the social network. The functionality of the social media-based platform may also be distributed across multiple servers disposed across the network 106.

The social network server 108 is, in some embodiments, able to store and retrieve data from the social network user database 110. In some embodiments, the social network server 108 is able to provide data from the social network user database 110 to another authenticated server, such as the web application server 112 via the network 106. Multiple social network servers 108 may be coupled to the network 106, with one or more social network servers 108 providing services for distinct social networks.

The mobile telephone network server 109 may be any combination of software agents and/or hardware modules for establishing a mobile telephone network for users. The mobile telephone network server 109 may facilitate interaction and communication among users of the client devices 102A-N, with the web application server 112, or with other related applications and/or systems via the network 106. For example, the mobile telephone network server 109 may provide a platform for users of the client devices 102A-N who are members of the mobile telephone network to call or text message other users of the client devices 102A-N. In one embodiment, the mobile telephone network server 109 may support web browsing over a mobile telephone.

The mobile telephone network server 109 is, in some embodiments, able to store and retrieve data from the mobile telephone user database 111. In some embodiments, the mobile telephone network server 109 is able to provide data from the mobile telephone user database 111 to another authenticated server, such as the web application server 112 via the network 106. Multiple mobile telephone network servers 109 may be coupled to the network 106, with one or more mobile telephone network servers 109 providing services for distinct mobile telephone networks.

The web application server 112 may be any combination of software agents and/or hardware modules for generating a customized online promotion to be used with a widget, and/or webpage, and/or promotion application to be integrated with one or more social media-based platforms. The promotion application is used with a social media-based platform and allows participants to enter the promotion from within the social media-based platform.

Alternatively or additionally, the web application server 112 may generate a customized mobile telephone promotion application for use in conjunction with a mobile telephone network platform and/or with mobile telephone devices. The mobile telephone promotion application permits a mobile telephone user to view and enter promotions generated by the web application server 112 without having to enter the internet browser on the mobile telephone to enter the promotion.

The web application server 112 is, in some embodiments, able to communicate with client devices 102A-N via the network 106 to receive detailed information about the promotion from the sponsoring organization's representative through promotion administration software. The detailed information may be stored and retrieved in the promotions database 114 via the network 106.

After a customized online promotion has been integrated with a promotion application within a participating social media-based platform and/or a widget and/or a webpage, the web application server 112 may, in one embodiment, receive completed promotion entry forms or promotion entry data from participants. In one embodiment, a participant may interact with the promotion or enter the promotion without submitting a promotion entry form. In one embodiment, the web application server 112 is able to communicate with the social network server 108 via the network 106 to receive information about a participant from the participant's social media profile. The entry form data and the information from the participant's social media profile may be stored, subject to a social network's privacy and third party developer guidelines, in the participant database 116 via the network 106 for later retrieval and analysis.

Figure 2:
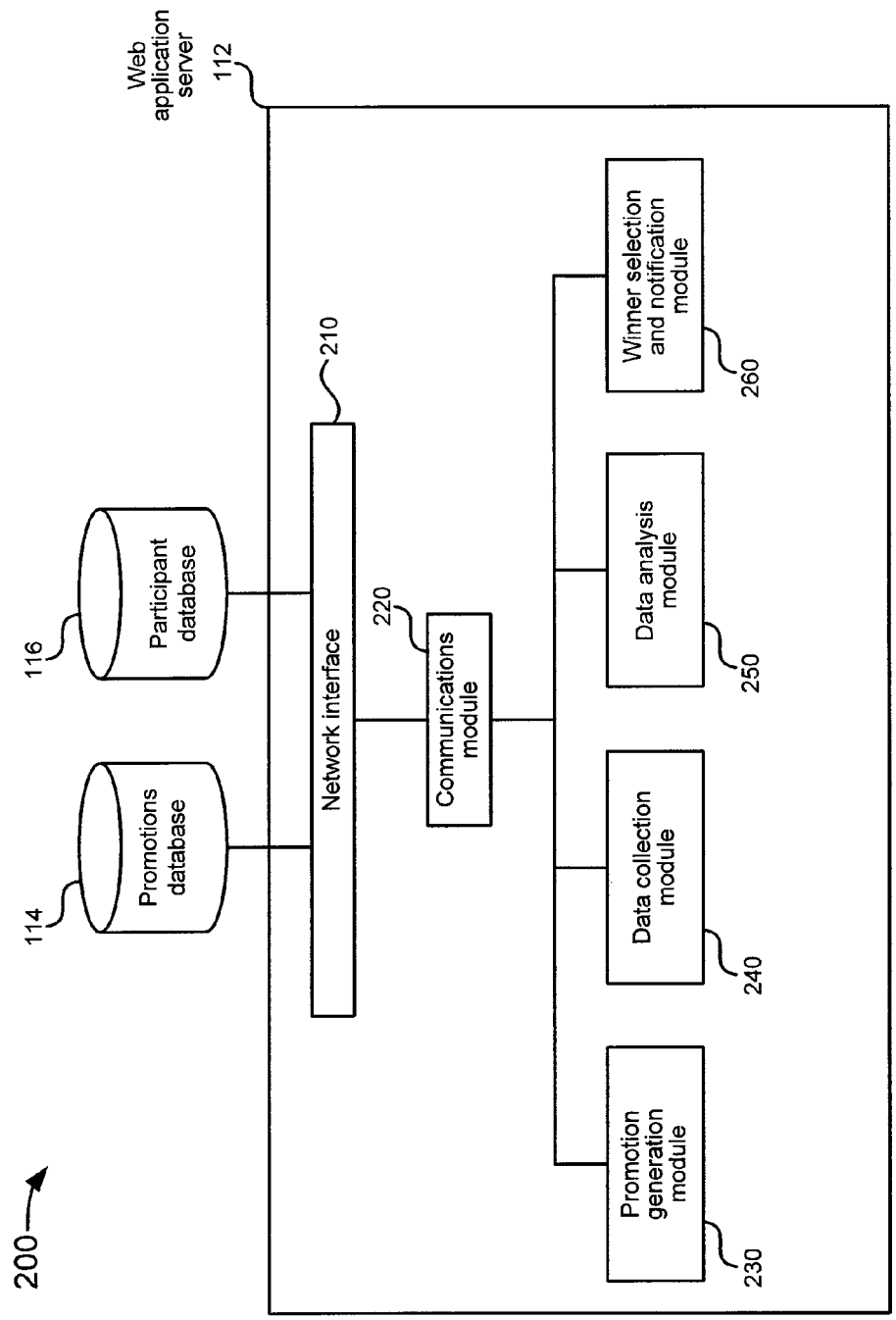
FIG. 2 depicts an example system for generating and running an online promotion through a social media-based platform including a web application server coupled to a promotions database and participant database according to one embodiment.

FIG. 2 is a block diagram 200 illustrating a system for providing a customized online promotion through the promotion administration software and integrating the online promotion with one or more social-media-based platforms and/or mobile telephone network platforms. The system may include a web application server 112 coupled to a promotions database 114 and/or a participant database 116, according to one embodiment.

In the example of FIG. 2, the web application server 112 includes a network interface 210, a firewall (not shown), a communications module 220, a promotion generation module 230, a data collection module 240, a data analysis module 250, and a winner selection and notification module 260. Additional modules or fewer modules may be included. The web application server 112 may be communicatively coupled to the promotions database 114, and/or the participant database 116 as illustrated in FIG. 2. In some embodiments, the promotions database 114 and/or the participant database 116 are partially or entirely internal to the web application server 112.

In the example of FIG. 2, the network interface 210 may be one or more networking devices that enable the web application server 112 to mediate data in a network with an entity that is external to the server, through any communications protocol supported by the server and the external entity. The network interface 210 may include, but is not limited to, one or more of a network adaptor card, wireless network interface card, router, access point, wireless router, switch, multilayer switch, protocol converter, gateway, bridge, bridge router, hub, digital media receiver, and/or repeater.

A firewall may, in some embodiments, be included to govern and/or manage permission to access data in a computer network, such as promotions database 114 and/or participant database 116, and track varying levels of trust between different machines and/or applications. The firewall may be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions may be performed or included in the functions of the firewall including, but not limited to, intrusion-prevention, intrusion detection, and personal firewalls. In some embodiments, the functionalities of the network interface 210 and the firewall are partially or wholly combined and the functions of which may be implemented in any combination of software and/or hardware, in part or in whole.

In the example of FIG. 2, the web application server 112 includes the communications module 220 or a combination of communications modules communicatively coupled to the network interface 210 to manage a one-way, two-way, and/or multi-way communication sessions over a plurality of communications protocols. In one embodiment, the communications module 220 receives data, information, commands, requests, and/or text-based messages over a network. In one embodiment, the communications module 220 receives communications from a network (e.g., internet, wired and/or wireless network) initiated via a web-interface.

Since the communications module 220 is typically compatible with receiving and/or interpreting data originating from various communication protocols, the communications module 220 is able to establish parallel and/or serial communication sessions with users of remote client devices for data and command exchange (e.g., user information and/or user content).

In addition, the communications module 220 can manage log-on requests received from one or more users connecting to the web application server 112 including, but not limited to, generating a new promotion, entering a promotion, reviewing participant data for a promotion, selecting a winner for a promotion, and/or providing information to be included with a notification and/or newsletter to be sent to participants of a promotion. In some instances, authenticated sessions are managed by the communications module 220 for user logon processes.

For example, the system may utilize a username/email and password identification method for authorizing access. The communications module 220 may gather data to determine if a user is authorized to access the system and if so, securely logs the user into the system. In other embodiments, other forms of identity authentication, such as security cards and/or digital certificates may be utilized. A user may be able to specify and/or obtain a logon ID after subscribing or registering.

The communications module 220 may also establish communication sessions with a social networking server 108 to transmit customized promotion banners and other information for displaying information about a promotion on a webpage within a social networking site or to transmit or receive information about participants.

One embodiment of web application server 112 includes a promotion generation module 230. The promotion generation module 230 may be any combination of software agents and/or hardware components able to request and receive detailed information from an organization or company about the promotion to be generated. Based upon the received information, the promotion generation module 230 generates a customized online promotion to be used with a widget and/or webpage and/or promotion application integrated with one or more social media-based platforms. In one embodiment, a customized business version of the promotion application is provided to the administrator of an organization running a promotion for adding to the organization's social media network page in order to display a promotion banner on the organization's social media network page. In one embodiment, the promotion application can be used to display a promotion banner on the organization's social network page because the promotion application is able to distinguish between downloads to a participant social network page and an organization social network page. In one embodiment, the organization's social network page may be run from a business page of the social network, if the social network provides business pages for organizations.

In one embodiment, a line of software code may also be provided by the promotion generation module 230 for pasting into the organization's webpage or other webpages external to participating social media-based platforms. The software code downloads a widget onto the webpage that displays information for advertising the promotion and the organization. The widget integrates the promotion with the viral features of the participating social media-based platforms and accesses the data contained in a participant's social media-based platform profile without requiring participants to migrate away from the widget. The widget may include, but is not limited to, clickable banners, clickable text, and clickable links. Upon clicking on any of the clickable objects, the participant may be provided a promotion entry form or some other way to interact with the promotion in order to enter the promotion.

In one embodiment the organization may be provided with the option to display a clickable banner, button or link on the website(s) instead of a widget. Clicking on the banner, button or link would take a participant to a webpage containing the promotion entry form In one embodiment, the promotion generation module 230 provides a listing page within each participating social media-based platform of all currently active promotions accessible from a webpage within the social media-based platform. In one embodiment, the listing page only includes promotions that have recently been entered by the participant's social network friends. In one embodiment, the listing page only includes promotions that relate to the interests and/or demographic of the participant as determined by the participant's social network profile data. In one embodiment, the participant can pre-define which types of promotions he wishes to appear on the listing page. In one embodiment, a listing page of all currently active promotions is provided on a webpage or webpages external to the participating social media-based platforms In one embodiment, the promotion generation module 230 may provide a promotion application to a participant for adding to the participant's social network profile, if the participant has not previously entered a promotion through the promotion application.

In one embodiment, an online promotion for use with mobile telephones on a mobile telephone network platform may allow a mobile device user to access the promotion in multiple ways. The mobile device user may download to his mobile device a mobile phone promotion application designed for use with mobile devices, such as an iPhone. Alternatively, the mobile device user may access the device's browser and enter a promotion through the social network of his choice or the website of the organization offering the promotion or another website external to the participating social media-based platforms. In both situations, the viral features of the social network or networks associated with the promotion are available to increase awareness of the promotion and the organization.

In one embodiment, the mobile telephone promotion application allows location-specific promotions to be offered. For example, if a mobile phone user is in proximity to a business running a promotion such as a contest or a coupon giveaway, the user receives an alert inviting the user to enter or redeem the promotion.

In one embodiment, the mobile telephone promotion application may access global positioning system (GPS) data provided by a participant's mobile telephone. The GPS data can be used in conjunction with an organization's promotion. For example, the GPS data may be used to determine the eligibility of a participant for a promotion For example, if a participant is located within a predetermined area within a certain time window, the participant would be eligible for a promotion or an incentive. Alternatively or additionally, the GPS data can be used to evaluate a participant, for example, measuring how quickly a participant completes a scavenger hunt promotion that requires participants to visit certain points in a city or region. In one embodiment, the GPS data may be used in the generation of activity feeds (such as newsfeeds and minifeeds) that display information about participants' interactions with promotions that are being run using the mobile telephone promotion application. For example, when a participant enters a store that is running a promotion, a newsfeed may be generated in the participating social network based platforms. In one embodiment, the GPS data can also be used by the mobile telephone promotion application to enable a participant to interact with the promotion.

One embodiment of the web application server 112 includes a data collection module 240. The data collection module 240 may be any combination of software agents and/or hardware components able to generate promotion entry forms for a participant and to receive completed promotion entry forms from participants, through the communications module 220. The promotion entry form may advertise the promotion and allow the participant to interact with the promotion by entering the promotion and/or providing required information prior to entering the promotion.

In one embodiment, the data collection module 240 may provide a method to advertise the promotion and for the participant to interact with the promotion without the explicit use of promotion entry forms. For example, the data collection module 240 may collect data from participants through questions used in part of a quiz promotion.

In one embodiment, a participant may be advised by the data collection module 240 that by downloading the promotion application, the participant grants the web application server 112 permission to access the participant's unique identifier within the social network or the mobile telephone network, and also accepts the terms of entering a promotion. Access to a participant's unique identifier enables the web application server 112 to send targeted information relating to the promotion or the organization running the promotion to the participant through the social network server 108. Terms for entering a promotion may include agreeing to receive unsolicited information, for example, a newsletter sent by either the web application server 112 or the organization running the promotion. Alternatively or additionally, the terms for entering a promotion may include the participant's permission for the organization running the promotion to use the information provided by the participant to promote other goods or services that may or may not be related to the underlying promotion or to promote other related business activities of the organization. In one embodiment, if an organization is promoting a third party organization's goods and/or services, the terms for entering a promotion may include the participant's permission for the third party organization to use information provided by the participant for related business activities.

One embodiment of the web application server 112 includes a data analysis module 250. The data analysis module 250 may be any combination of software agents and/or hardware components able to analyze the data collected from participants in a particular promotion through the participants' promotion entry forms or other forms of data resulting from participants' interaction with the promotion. The data analysis module 250 may generate data that include, but are not limited to, date and time of entries, unique identifiers of participants, participant information, such as email address or date of birth, and a demographic breakdown of participants by age, gender, zip code, the average age of participants, etc. The data analysis module 250 may also generate information about the types of contests, prizes, or offers that generated the greatest number of entries, for example sporting event tickets. In one embodiment, the data analysis module 250 may provide names and/or unique identifiers of participants who invited the largest number of friends to enter the promotion and/or names of participants whose friend invites ultimately resulted in the greatest total number of people who entered the promotion. In one embodiment, the data may be numerical, graphical, or both.

The data analysis module 250, through communications with the communications module 220, may make the data available to an organization running the promotion at a particular secured website and may also provide the analyzed data in a downloadable format, for example in an Excel spreadsheet. Alternatively or additionally, the data may be sent to the organization in an email through the communications module 220.

In one embodiment, the data analysis module 250 may verify one or more of the data provided by participants in the entry form or during interaction with the promotion. In one non-limiting example, a participant may be required to be at least 18 years old and/or from a specific country, state or location before participating in a particular promotion. Thus, the participant's age and/or geography may be verified prior to permitting the participant to enter the promotion. In another non-limiting example, a participant's email address or other entry information may be verified before permitting the participant to enter the promotion or if a participant is selected as a winner, the participant's email address or other entry information may be confirmed prior to awarding of the prize.

One embodiment of the web application server 112 includes a winner selection and notification module 260. The winner selection and notification module 260 may be any combination of software agents and/or hardware components able to randomly select one or more winners from all the promotion entries, as specified by the promotion rules. Alternatively, the winner selection and notification module 260 may select a winner according to other criteria specified by the rules of the promotion. The winner selection and notification module 260 may not always be used by an organization to select a winner. The organization may choose to select its own winner, for example, based upon subjective criteria such as the best slogan submitted for a product. If the organization selects the winner, the organization may submit the name of the winner or winners to the winner selection and notification module 260. Alternatively, submission of entries that are subjectively evaluated may be thrown open to judging by members of the social network. For example, each member of the social network may be permitted to vote a maximum number of times during the contest or a maximum number of times per day for a preferred entry, and the winning entry is the one that garners the greatest total number of votes at the close of the promotion. By integrating user voting within the social media-based platform, viral features, such as newsfeeds and minifeeds, further spread the word about the promotion. For example, if the promotion were a video contest, members of a social network could vote for their favorite video, and the act of voting would generate a newsfeed that included, but is not limited to, the name of the person, the name of the video that the person voted for, and the name of the organization sponsoring the video contest. In addition, the video itself may be embedded in the newsfeed.

Once a winner is selected, whether by the winner selection and notification module 260, by the organization running the promotion, by voting, or by another method, the winner selection and notification module 260 may, through the communications module 220, notify all the participants who entered the promotion of the identity of the winner or winners. Notification may be by email or through custom messages directed to the social network inbox of all participants. In one embodiment, instant win game contestants will be instantly notified on the screen as to whether or not they have won a prize immediately after entering and/or through one of the above notification procedures.

Figure 3A:
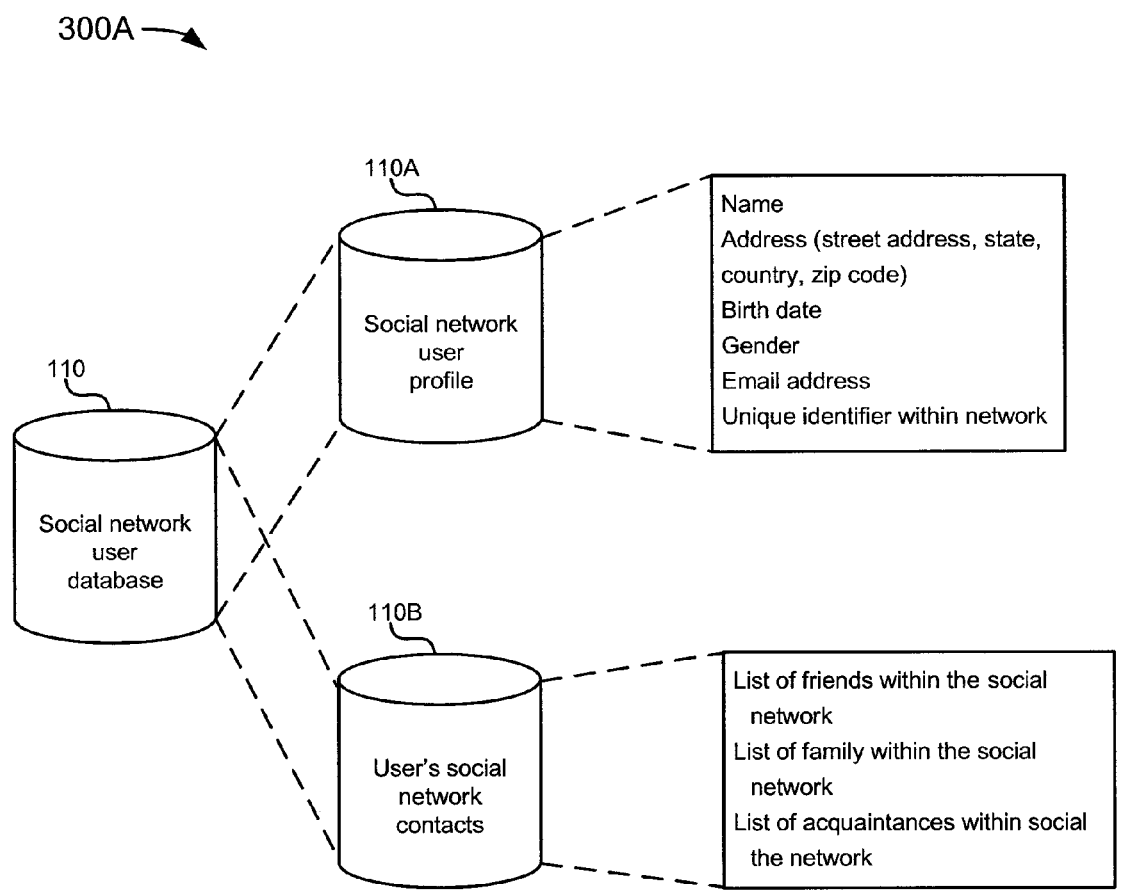
FIG. 3A depicts an example of a social media user database storing a social media user's profile information and network contacts according to one embodiment.

FIG. 3A depicts a block diagram 300A illustrating an example of a social network user database 110 that stores social network user profile information 110A and the user's social network contact information 110B, according to one embodiment.

In the example of FIG. 3A, the social network user profile database 110A can store user profile data, including descriptive data of personal information such as, but not limited to, a first name and last name of the user, a valid email address, a unique user identifier within the social network, birth date, gender, occupation, etc. User profile data may further include interest information, which may include, but is not limited to, activities, hobbies, photos, etc. In one embodiment, the social network server 108 may store the information in the social network user database 110, and the web application server 112 may be permitted to access information in the social network user database 110 if the user grants permission. The database 110 may also store a user's social network contacts, for example, in database 110B. A user's social network contacts may be provided via one or more software agents and/or hardware modules coupled to the database 110B. For example, a user may invite a member of the social network to become a friend, and the invited member may become listed as such in the user's list of social network contacts if the invited member agrees.

A mobile telephone user database 111 for a mobile telephone network stores information similar to that of the social network user profile 110A portion of the social network user database 110, such as name, address, and mobile telephone number.

Figure 3B:
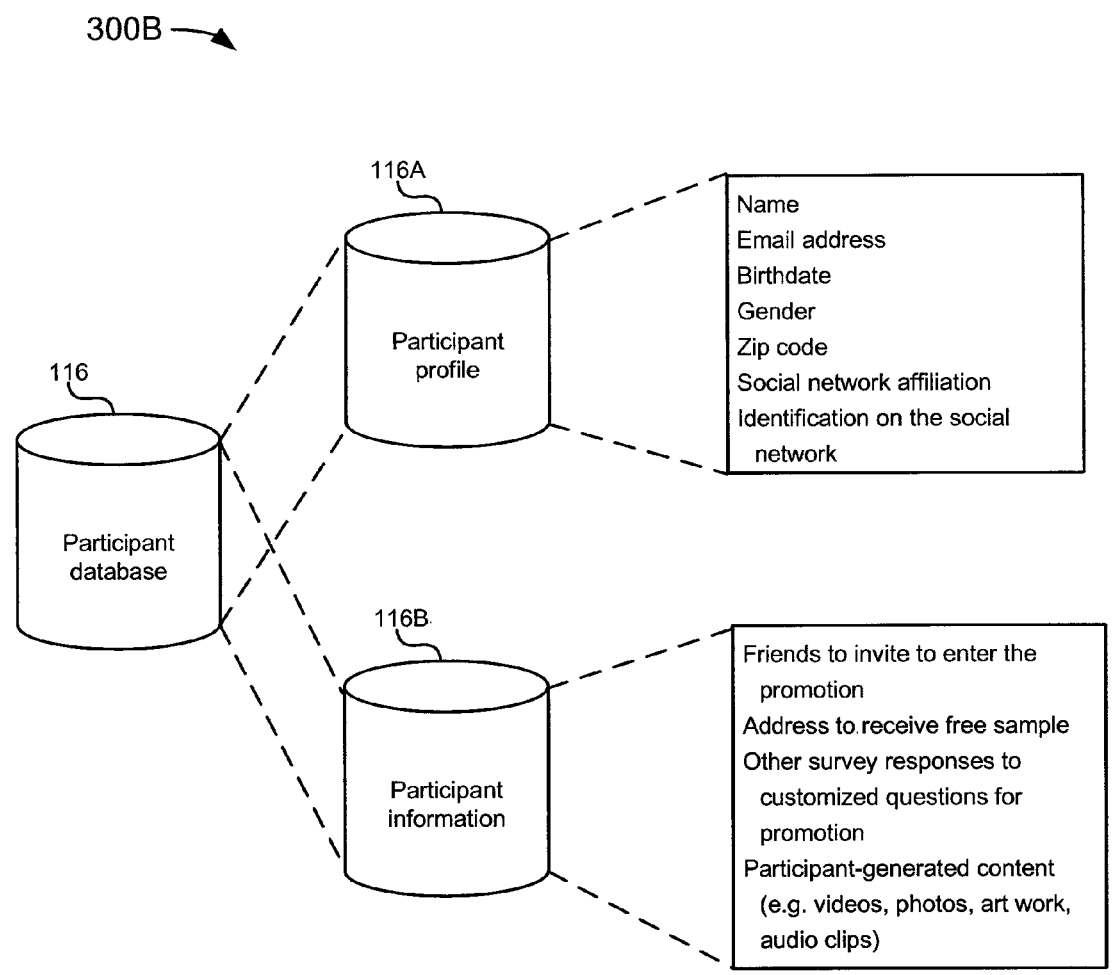
FIG. 3B depicts an example of a participant database storing participant profile information and participant responses according to one embodiment.

FIG. 3B depicts a block diagram 300B illustrating an example of a participant database 116 that stores participant profile information 116A and a participant's survey responses 116B, according to one embodiment.

In the example of FIG. 3B, a participant's profile information is stored in database 116A. Participant profile information includes descriptive data of personal information such as, but not limited to, a first name and last name of the user, a valid email address, birth date, gender, zip code, one or more social network affiliations and/or mobile telephone network affiliation, and a unique identifier on the one or more social networks and/or mobile telephone network the participant is affiliated with, etc.

The database 116 may also store a participant's responses to surveys and/or requests to invite friends, for example, in database 116B. A prerequisite to being entered in a promotion may be for a user to complete a survey provided by the administrator of the promotion. Survey questions may include, but are not limited to, providing a name, an email address, demographic information, an address for receiving free samples and/or promotion materials and preference for joining a mailing list. In one embodiment, survey questions may include the option of electing to join one or more groups associated with the one or more social media-based platforms and the organization or a third party organization. For example, a participant may be given the opportunity to click a button or a link in order to become a fan of the organization's Facebook page, and the organization is then permitted to send messages via the Facebook platform to this participant so long as the participant remains a fan. In one embodiment, clicking on a link or a button or checking a box to elect to become a member of a group associated with an organization will automatically result in the participant becoming a member. Alternatively, clicking on a link or button or checking a box to elect to become a member of a group associated with an organization will trigger a pop-up window or a new browser window to open where the participant can take action to become a member of a group. Upon submission of a promotion entry form, the participant is shown a webpage listing the names of the participant's social network friends, and he can select friends to invite to enter the promotion. An organization may provide an incentive to contestants for inviting friends by, for example, increasing the participant's chances of winning for each friend that is invited or for each invited friend that subsequently enters the promotion.

Figure 3C:
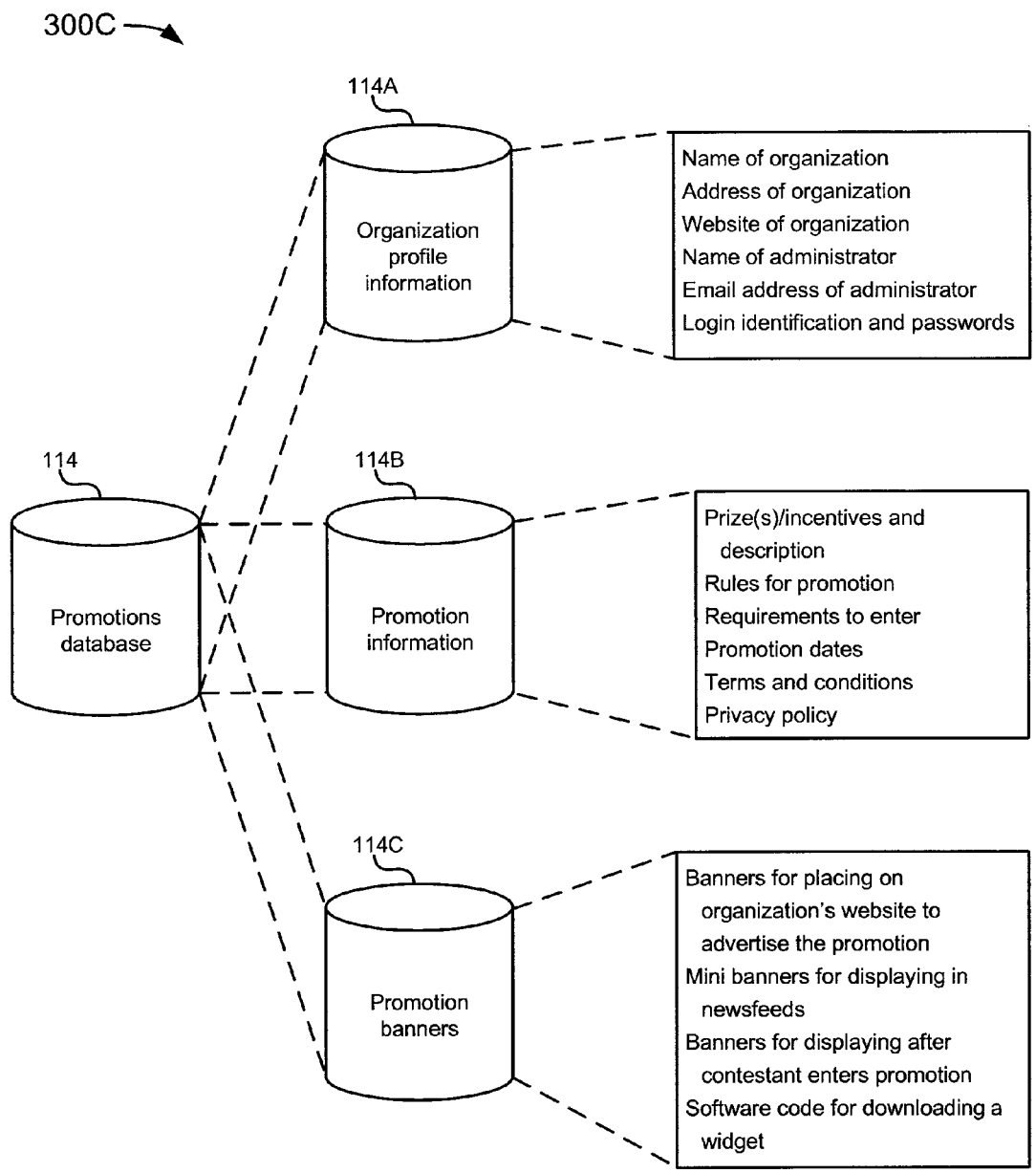
FIG. 3C depicts an example of a promotions database storing organization profile information, promotion information, and promotion banners, according to one embodiment.

FIG. 3C depicts a block diagram 300C illustrating an example of a promotions database 114 that receives promotion information, according to one embodiment.

In the example of FIG. 3C, the profile information for an organization submitting a promotion is stored in database 114A. Organization profile information includes, but is not limited to, the name of the organization, address of the organization, a website address for the organization, names for one or more administrators within the organization, an email address for one of the administrators of the promotion, login identification, and passwords.

The promotions database 114 may also store promotion information in database 114B. Promotion information may include, but is not limited to, offered prize or prizes, discounts or other incentives, and descriptions of those incentives, value of the incentives, official rules of the promotion, requirements to enter the promotion, survey questions, the active dates for the promotion, terms and conditions, and the privacy policy of the organization with respect to information collected from participants.

The promotions database 114 may also store banners and widgets associated with a promotion in database 114C. Types of banners include, but are not limited to, banners for placing on an organization's website to advertise the organization's promotion, interactive widgets, mini-banners displayed in newsfeeds generated by the social network server 108 that advertise the promotion, and banners for displaying to a participant after the participant submits his entry to the promotion. In one embodiment, banners may be any size including, but not limited to, standard banner sizes, oriented horizontally, or oriented vertically.

Figure 4:
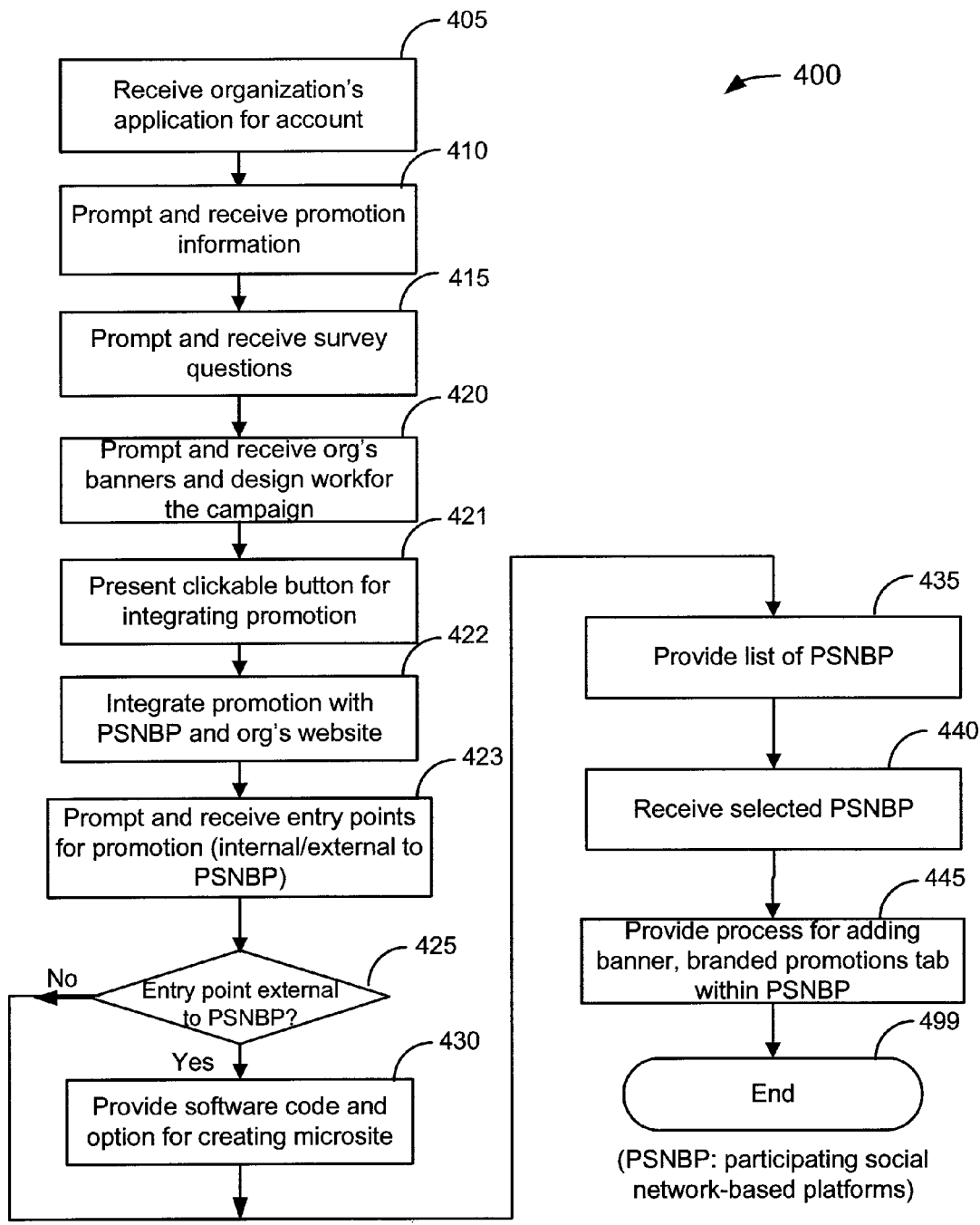
FIG. 4 depicts a flow chart of a process of establishing a customized promotion with a web application server according to one embodiment.

FIG. 4 depicts a flow diagram 400 illustrating an example process of establishing a customized promotion with the web application server, according to one embodiment. Prior to permitting a company or organization to generate a customized promotion, the company or organization must first create an account with the web application server by transmitting account information to the system, preferably through a website, but mailed-in or faxed applications may also be used for creating an account on the system. The system receives the account information at block 405. Account information may include, but is not limited to, the organization's name, people permitted access to the company account, a billing address and billing information, such as a credit card number or billing authorization information. The organization is either assigned a login name and password, or the organization's representative may choose them. By providing the correct login information for an organization, the organization's representative is permitted to access the information for each promotion that the organization has created. After creating an account, at block 410 the organization's representative is prompted online by promotion administration software for information to set up the organization's promotion. A promotion may include, but is not limited to, sweepstakes such as prize draws and instant win sweepstakes, contests such as participant-generated content contests like video, photo, or music contests and quizzes, discount vouchers or coupons, games, prediction markets, and product sampling.

In one embodiment, organizations can distribute individualized and secure coupons or vouchers as a part of an online promotion through social media channels using the techniques introduced here. These coupons may be distributed through applications within the social media platforms, such as Facebook or on webpages which may be integrated with Facebook Connect or other similar services that enable websites to access the profile information of social network users. The coupons or vouchers can contain information such as the name, birth date, birth year, and social network profile photo of the participants interacting with an online promotion. By offering the coupon or voucher via an application within a social network such as Facebook or via a webpage that's integrated with Facebook Connect or a similar service, organizations are able to tap into the database of the participant's social media profile to obtain and display identifying information about the participant on the coupon or voucher. This enables the system to provide the participant's information directly on the coupons or vouchers, which provides a much higher level of identification of coupon holders than what has been previously available.

The information harvested from a participant's social network depends on what information the participant makes available on his or her social media website. The advantage of this is that this technique provides an extra level of security for companies providing coupons because it is very difficult for a coupon holder to just copy a bunch of coupons and give them to their friends. Including personalized information about the coupon holder on the coupons or vouches is a more secure method of distributing promotional incentives. For example, each coupon holder can be limited to receiving a fixed number of coupons and can be forbidden from passing along the coupon to other persons. Each coupon is unique and includes a unique code; and if the coupon holder has provided a profile picture, the coupon can also include the coupon holder's profile picture for further guarantees of security. These unique codes can be generated and provided to the companies engaging in online promotions, or they can be generated externally and provided to the companies. In one embodiment, a company's website may include a shopping cart that is able to generate unique codes, which can then be uploaded to a system that performs the techniques introduced here. Further, these coupons or vouchers may also include a time-stamp for further guarantees of authenticity.

Figure 6A:
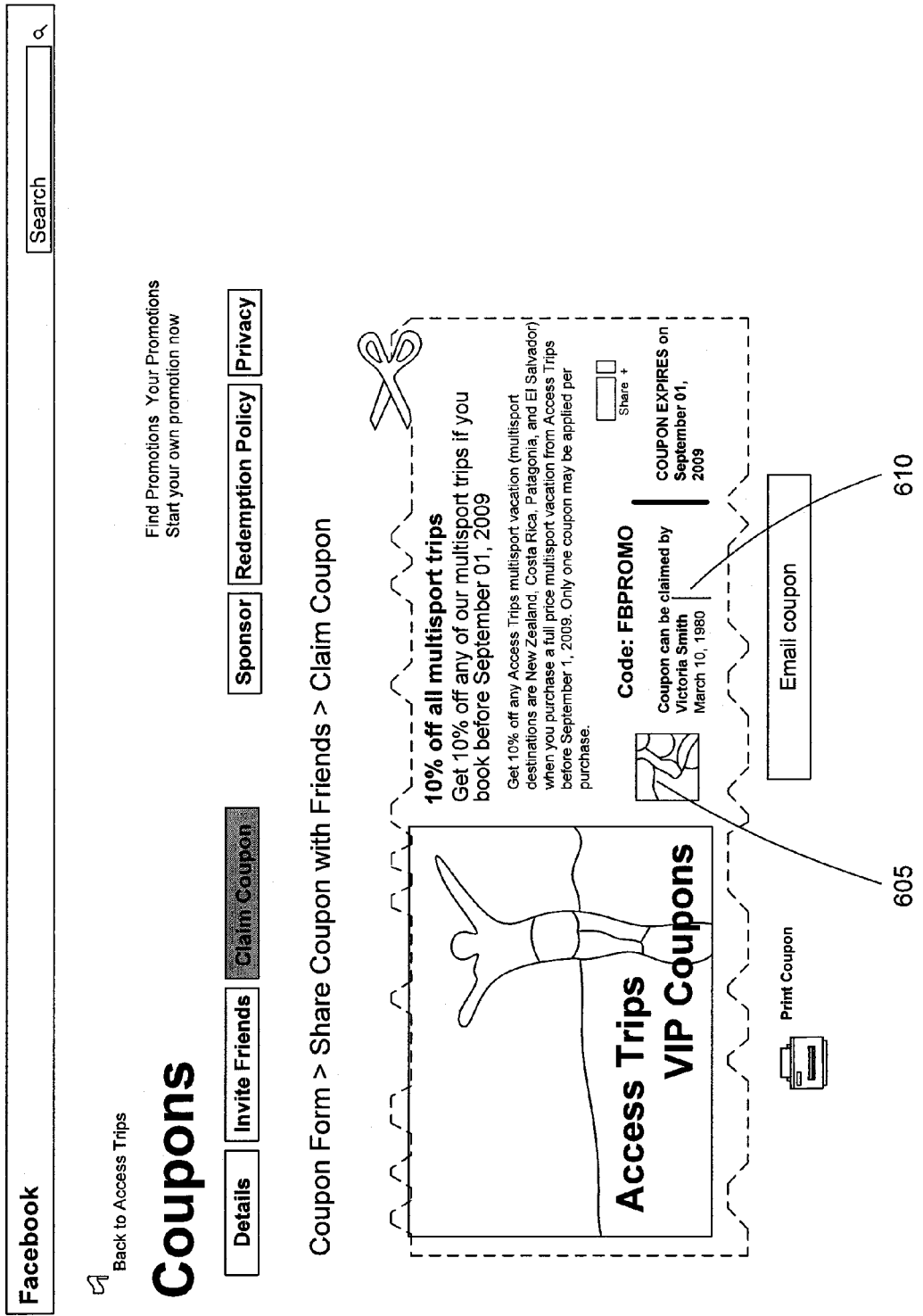
FIG. 6A depicts a screen shot of a promotional coupon according to one embodiment.

FIG. 6A shows a screen shot of a promotional coupon that includes the photo profile 605, and name and birth date 610 of the recipient coupon holder that was available from the Facebook database. FIG. 6B shows a screen shot of a set-up process where an organization's representative can control the specific recipient information that gets displayed on the coupon or voucher.

Details of the promotion may include, but are not limited to, the name of the promotion, the prize or prizes, discounts or other incentives to be offered along with a description and estimated value of the incentives, when the promotion begins and ends, requirements to enter the promotion, incentives to invite friends, terms and conditions of the promotion, and any applicable privacy policy. In one embodiment, standard terms and conditions and/or privacy policy may be offered to the organization for use with the promotion. In one embodiment, the organization may define a limit on the overall number of interactions that users may have with a promotion, for example, a limit on the overall number of discount coupons that may be downloaded during the promotion. The details of the promotion are received by the system at block 410.

After submission of the promotion information, at block 415 the organization's representative is prompted to define survey questions and/or text to be included in a customized promotion entry form to be presented to a potential participant. Survey questions may include, but are not limited to, name, address, email address, interests, hobbies, vocation, etc. In one embodiment, questions include data used by an organization for marketing, branding, and/or future product line decisions. The system receives this information at block 415.

At block 420, the company is prompted to upload to the system a customized banner(s) or other design work for the promotion. Alternatively, template banner designs may be offered to the company for selection. Banners may be used to advertise the promotion and/or the brand of the organization sponsoring the promotion. Several types of banners may be uploaded, including but not limited to, a banner to place on the organization's social network webpage or company webpage, on other webpages within or external to a participating social media-based platform, or on a promotion widget on webpages within or external to participating social media-based platforms to advertise the promotion; mini-banners that may be displayed with newsfeeds, minifeeds and other similar user activity display features that are automatically generated when a consumer enters the promotion; and a banner for display when a participant has finished entering the promotion. Banners are clickable and may direct a participant to a promotion entry form or other entry point for interacting with a promotion. Alternatively, banners displayed after the participant has entered the promotion may direct the participant back to the organization's website or social network page. The system receives the banners and/or banner selections from the organization at block 420.

At block 421, the organization is presented with a clickable button for integrating its promotion with the promotion application in the participating social media-based platforms. Clicking this button will result in the integration of the promotion with the promotion application in all participating social media-based platforms (PSNBP) and the organization's own website at block 422. In fact, participants may click a different button for each social network that they want their promotion campaign to display on. Participating social media-based platforms are those social media-based platforms that are willing to support the promotion application and for which software is available to integrate the promotion application with the particular social media-based platform. Examples of online social media-based platforms that may participate include Facebook, MySpace, Bebo, Orkut, and Friendster. Integrating a promotion with the promotion application within a participating social media-based platform enables participants to enter and interact with the promotion within a social network upon clicking a link to the promotion, such as found in a newsfeed or friend invite, for example. It should be noted that the organization does not need to maintain a webpage on a particular social media-based platform in order to have the promotion integrated with that platform. In one embodiment, integrating a promotion enables the promotion to be integrated with the viral features of a social network. In one embodiment, it enables the promotion to be included in the promotion listings page which is provided by the promotion application in each of the participating social media-based platforms and displays all promotions currently integrated with the promotion application. In one embodiment, the promotion applications' listing page of a given social media-based platform is presented to a promotion participant after completion of the entry process for a promotion so that the participant may find other promotions of interest to enter.

In one embodiment, an organization can choose which participating social media-based platforms they would like to integrate their promotion with rather than automatically having their promotion integrated with all participating social media-based platforms.

At block 423, the organization is prompted to select where it would like to locate the entry point or entry points for its promotion. It can choose to locate the entry point(s) on one or more webpages external to the participating social media-based platforms or on one or more webpages within the participating social networks. The system receives the entry point information from the organization at block 423.

When the chosen entry point is a webpage external to the participating social media-based platforms, a participant interacts with a widget that advertises the promotion on the website(s). The participant clicks on the widget to enter the promotion, and the widget displays the promotion entry form. The widget integrates the promotion with the viral features of the participating social media-based platforms and accesses the data contained in a participant's social media-based platform profile without requiring participants to migrate away from the widget. In one embodiment, clicking on the widget enables the participant to interact with the promotion (e.g. play a game, enter a quiz, scratch an instant win card, upload a video) before the participant is required to complete the entry form. In one embodiment the participant can interact with the promotion without completing an entry form. Upon completing the entry form or the promotion entry process through the widget, the participant is directed to invite friends to the promotion by using one of two methods. The participant may select friends from his social network friends list which is connected to the widget via services such as Google's FriendConnect, Facebook's FacebookConnect, MySpace's DataAvailability project and other similar services that enable third-party applications or websites external to social networks to access a user's data and friends list contained within social networks, and to transmit users' activity information back to the newsfeeds, minifeeds and other such activity feeds contained within social networks. Alternatively or additionally, the participant may type in friends' email addresses or select friends from his email address book which the participant can download into the widget from such email service providers as Gmail, Hotmail and Yahoo Mail.

In one embodiment the participant interacts with the promotion via an interactive webpage or webpages instead of a widget. The interactive webpage or webpages provide an entry form for the promotion and enable the participant to interact with the promotion. By connecting with services such as Google's FriendConnect, Facebook's FacebookConnect, MySpace's DataAvailability project and other similar services, the interactive webpage or webpages integrate the promotion with the viral features of the participating social media-based platforms and access the data contained in a participant's social media-based platform profile without requiring participants to migrate away from the interactive webpage or webpages. In one embodiment, the participant may click on a banner, button, or link that takes the participant to the interactive webpage or webpages for entering and interacting with the promotion. In one embodiment, the banner, button, or link may be located on an organization's website which advertises the promotion; a participant who clicks on one of these objects will be taken to the interactive webpage or webpages where he can enter and/or interact with the promotion. In one embodiment, the interactive webpage or webpages may be hosted by the web application server 112.

In one embodiment, an organization may choose to use a webpage dedicated to the entry process for their promotion, rather than a widget, because the widget may not provide sufficient graphics or other text, as desired by the organization to advertise the promotion. In one embodiment, an organization may select the widget because of its compact size and ability to enable a participant to interact with and/or enter a promotion without the participant needing to migrate away from the webpage upon which the widget is displayed, for example, the organization's webpage When the chosen entry point is on the organization's social network webpage or other webpage within one of the participating social media-based platforms, a participant clicks on a banner, widget, or link that advertises the promotion on the particular webpage, and the participant is directed to add the promotion application to the participant's social network profile. Alternatively, the participant may click on a banner, a link in a newsfeed or minifeed, a link in a friend invitation, or any link to the promotion generated by a viral feature of the social media-based platform, and the participant will be directed to add the promotion application to the participant's social network profile. In one embodiment, the participant may click on the banner, widget, or link and directly enter the promotion without downloading the promotion application to his social network profile.

At decision block 425, the system determines if the organization has chosen to have an entry point to the promotion on a webpage external to the participating social media-based platforms. If the organization chooses to establish an entry point for the promotion on a webpage or webpages external to the participating social media-based platforms (block 425— Yes), at block 430, the system provides software code, such as HTML or Javascript code, that may be copied and pasted into a webpage or webpages. The organization is also provided the option of publishing its promotion via a microsite linked to the organization's webpage or webpages. For the first option, the software code displays a widget on the webpage(s); the widget advertises the promotion and enables a participant to interact with and enter the promotion, thus the widget functions as an entry point to the promotion. In one embodiment the organization can select from a variety of widget templates that offer different design, layout and color options. Each template has its own unique software code that the organization can copy and paste into a website(s) to display the widget. In one embodiment the organization may be provided with the option to display a clickable banner, button, or link on the webpage(s) instead of a widget. Clicking on the banner, button, or link would take a participant to a webpage containing the promotion entry form.

For the microsite option, the organization representative does not need to paste code into a webpage. The promotion administration software permits the representative to simply click on an appropriate button that triggers publication of the organization's microsite.

The process continues to block 435 where the system presents a list of the participating social media-based platforms with which the organization's promotion has been integrated. The system also provides links corresponding to these participating social media-based platforms to which the organization can, if it wishes, add a promotion banner/entry point to particular webpages within those participating social networks. The webpages may be those that the organization maintains within the selected social media-based platforms. Alternatively or additionally, the webpages may also be maintained by entities other than the organization that permit the organization to insert promotion banners/entry points. The system receives the selected social media-based platforms at block 440.

In one embodiment, regardless of whether the organization chooses to add a promotion banner/entry point to particular webpages within the participating social media-based platforms, the promotion application will list the organization's promotion on a promotion listing page, with a clickable link, within the participating social network based platforms. In one embodiment the organization's promotion will also be listed on a promotion listing webpage that is external to the participating social media-based platforms. Thus, a participant may easily find and enter the promotion without having to go to a particular organization's webpage.

At block 445, the system provides the organization with two options for integrating a promotion with a social media-based platform. For the first option, a banner is added to the webpages of the specified social media-based platforms. The details for publishing a banner on webpages within different social media-based platforms may vary. However, as an example, the process for publishing a promotion banner on the organization's Facebook webpage(s) will be described. Clicking on the Facebook link provided at block 435 takes the organization's representative to a Facebook page where the representative can click on a link to download the promotion application for publishing promotion banners within Facebook. Because the application is downloaded to a business page on Facebook, the promotion application recognizes that the user is an organization and provides customized features for business users. In one embodiment, the organization downloads a customized business version of the promotion application. The organization is then prompted to provide its log-in information supplied to the promotion administration software that it previously established at block 405. After inputting the log-in information, the organization is taken to a webpage where the organization's promotions that are integrated with the promotion application in Facebook are listed. A banner publication button is displayed next to each promotion which, when clicked, will add the banner for that promotion to the organization's Facebook page(s). The process ends at block 499, and at this point the promotion is ready to be entered from the organization's social network page and/or a webpage external to the participating social networks. Alternatively, the start of the promotion may be delayed until a specific date received by the system at block 410.

For the second option, the organization can create a dedicated tab within the organization's social network page within which they can publish one or more promotions, such as provided for by the social network Facebook.

In one embodiment, a promotion banner may be added to a webpage within a participating social media-based platform that is not controlled by the organization running the promotion, if the controller of the webpage agrees. For the example Facebook platform, the controller of the webpage would download the promotion application from within Facebook first and then go through a similar process as described above for adding a banner for the promotion to the webpage.

In one embodiment, an organization may paste the software code for displaying a widget on one or more webpages within a participating social media-based platform if the platform permits pasting software code for widgets, for example the MySpace platform.

If the organization chooses to not publish the promotion on its own webpage or another webpage external to the social media-based platforms (block 425—No), the process continues at block 435 as described above.

Figure 5A:
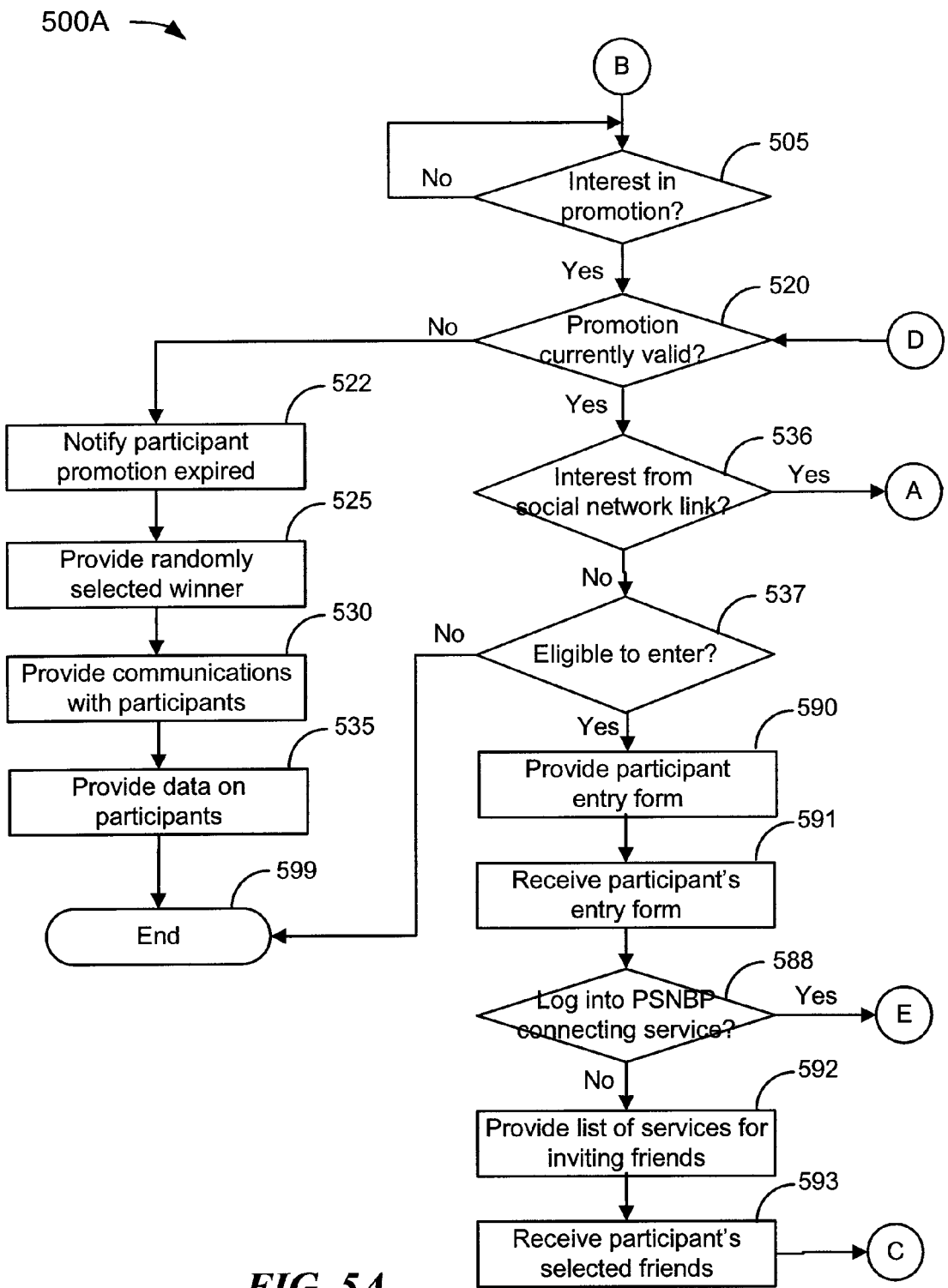
FIG. 5A depicts a flow chart of processing promotion entries and post-promotion processing according to one embodiment.
Figure 5B:
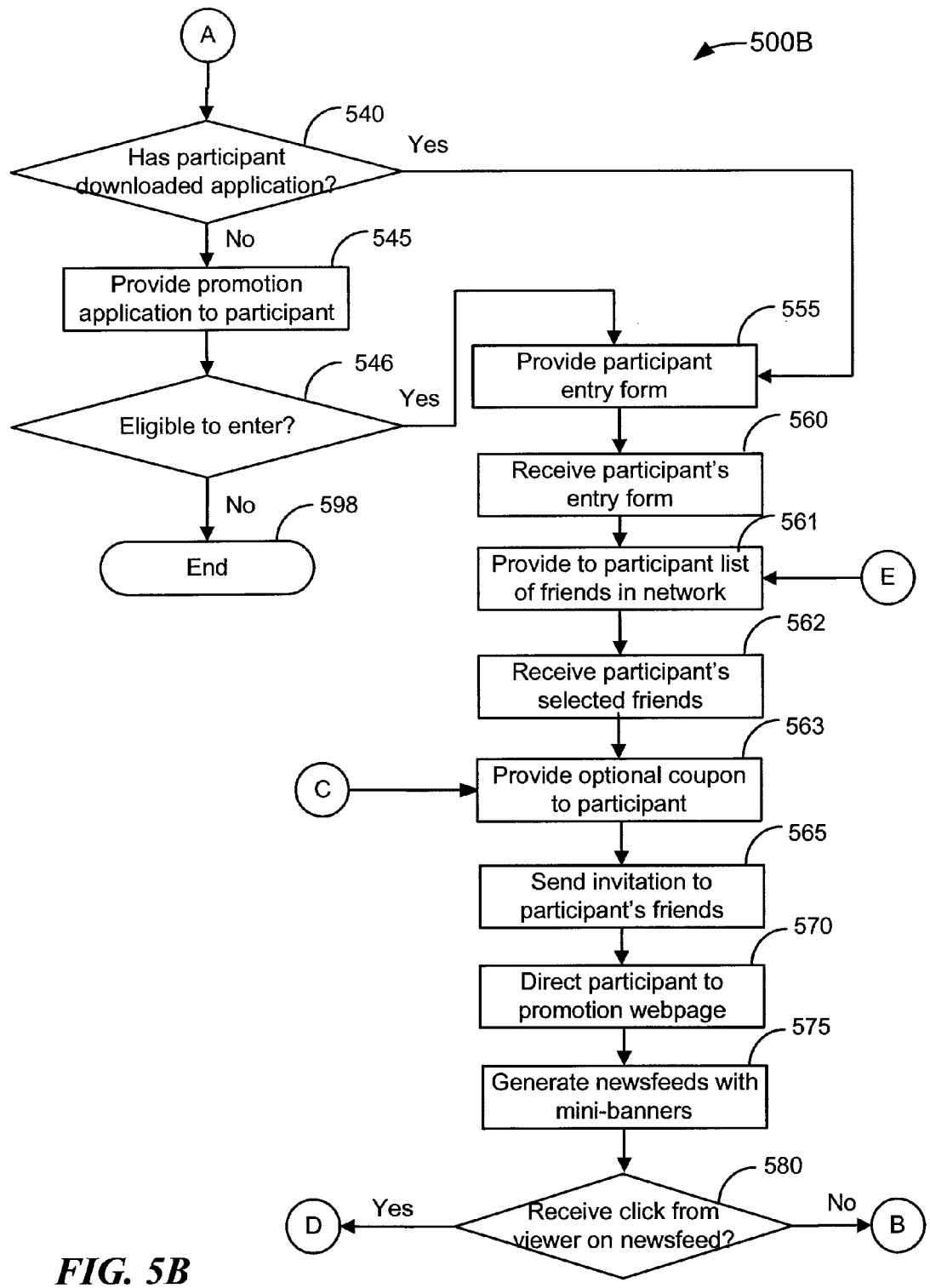
FIG. 5B depicts a flow chart of processing promotion entries and post-promotion processing according to one embodiment.

FIGS. 5A and 5B depict flow diagrams 500A and 500B illustrating an example process of determining a participant's entry point to a promotion, processing promotion entries, and post-promotion processing, according to one embodiment.

The process starts at decision block 505 where the system determines if a participant has indicated an interest in the promotion. Interest in the promotion is indicated when a participant clicks on a link to enter the promotion. There are multiple ways for a participant to enter a promotion. The participant may click on a widget, banner, or link on the organization's website or e-newsletter, on a widget, banner, or link on other webpages external to the participating social media-based platforms, or on a widget, banner, or link within a social media-based platform, such as on the organization's webpage within a social network or on a link generated by a viral feature of a social network, such as a newsfeed, mini-feed, or friend invite. The participant may also click on a link in a banner advertisement, which will direct the participant to the promotion widget or webpage for entering the promotion. If interest in the promotion is not detected (block 505—No), the system remains at decision block 505 until a participant clicks on a promotion link.

If interest in the promotion is detected (block 505—Yes), at decision block 520, the system checks the date and time to determine if the promotion is currently valid and still running. If the promotion has ended (block 520—No), at block 522, the system notifies the participant that the promotion has expired.

The process continues to block 525 where the system may provide a randomly selected winner or winners for the promotion and transmit the name and contact information of the winners to the organization. Alternatively, the organization may decide to choose a winner or winners in a different manner on its own. For example, if the promotion is seeking entries for a new product slogan, the organization may have its own judging procedures.

At block 530, the system may provide communications that notify promotion participants of the winner or winners of the promotion. If the system does not select the winners, the organization may provide the information to the system. Winners and non-winners may receive different messages. Communications may be done through email or through custom messages directed to the social network inbox of all participants. Alternatively or additionally, winners may be listed on the organization's website and/or the organization's social network page.

At block 535, the system may provide to the organization either raw data and/or analyzed data with statistics and/or graphs about the participants who entered the promotion. Data may include, but are not limited to, a demographic breakdown of participants by age, gender, zip code, the average age of participants, etc. Data may be obtained directly from participants' entry forms. In one embodiment, aggregate data may be provided by analyzing data from participants' social network profiles. The data and/or analysis may be available at a particular secured website. Alternatively or additionally, the system may email the results to the organization. The process ends at block 599, and the promotion is complete.

If the promotion has not ended (block 520—Yes), at decision block 536, the system determines whether the participant clicked on a link within a social media-based platform. If the participant clicked on a widget or link outside of a social media-based platform (block 536—No), the system checks at decision block 537 to see whether the participant is eligible to enter. A participant is eligible to enter the promotion only if he has not exceeded a pre-set number of promotion entries or coupon downloads within a specified time period, where the number of entries or downloads and the time period are determined by the organization sponsoring the promotion. For example, if the organization specifies that a participant may enter a sweepstakes promotion up to a maximum of three times per day, and the participant has only entered once so far that day, then the participant is eligible to enter. The system can check to see if a cookie has already been established on the participant's computer that includes information that the participant has exceeded the number of entries or downloads for a given period of time for that promotion. Although, cookies provide a way to track whether participants have previously entered a promotion, it is not foolproof because a participant can circumvent this check by erasing related cookies from his computer's memory. Alternatively or additionally, the user can be required to enter his email address, and the number of promotion entries or coupon downloads can be tracked and associated with the email address. If the participant is not eligible to enter (block 537—No), the process ends at block 599.

If the participant is still eligible to enter (block 537—Yes), the system provides the participant with an entry form at block 590. The promotion entry form prompts the participant for information that may include, but is not limited to, name, email address, address, birth date, gender, zip code, country of residence, and custom survey questions provided by the organization. In some embodiments, the participant may be able to interact with the promotion before filling out an entry form (e.g. receive an instant win card before needing to complete an entry form) or interact with the promotion without filling out an entry form (e.g. to vote for a participant-generated video entry). In both cases, the widget integrates the promotion with the viral features of the participating social media-based platforms and accesses the data contained in a participant's social media-based platform profile without requiring participants to migrate away from the widget.

In one embodiment, the participant may be directed to enter and interact with the promotion via a webpage rather than via a widget.

At block 591, the system receives the participant's entry form and/or any other information provided by the participant during the interaction with the promotion.

Next, at decision block 588, the system offers the participant the option to log into Facebook Connect or another service that enables the system to tap into the participant's social network data. If the system determines that the participant does not want to log into a connecting service (588—No), the process continues to block 592. If the system determines that the participant does want to log into a connecting service (block 588—Yes), the process continues to block 561.

After the participant has submitted the entry form or completed the entry process, the system invites the participant to invite their friends to interact with the promotion. In one embodiment, a participant may increase his chances of winning a prize or increase the value of a given discount or other incentive by inviting friends to enter the promotion. At block 592, the system provides one or more ways to invite friends to enter the promotion. In one embodiment, the system provides links to a list of services such as Google's FriendConnect, Facebook's FacebookConnect, MySpace's DataAvailability project and other similar services that enable third-party applications or websites external to social networks to access a user's data and friends list contained within social networks and to transmit participant activity data back to the social networks. After logging into the chosen service, the participant is presented with a list of his social network friends, and he can select friends to invite to the promotion. In one embodiment, a participant only needs to select from the list of services during the first interaction with the widget; during subsequent interactions with the widget the participant will automatically be logged into the chosen service. Further, by logging in to one of these services, the participant grants the web application server 112 access to the participant's unique identifier as assigned by the social network server 108 of the social media-based platform maintaining the friends list accessed by the participant. Then the web application server 112 is permitted to access the personal data contained in the participant's social media-based platform profile, subject to the social network's privacy and third party developer guidelines. Additionally, the web application server 112 is permitted to transmit information about the participant's interactions with the promotion to the newsfeeds, minifeeds and other user activity feeds of the participating social network. In addition, the participant agrees to the terms and conditions and/or a privacy policy specified by the web application server that applies to the organization running the web application server.

The links in the list of services provided by the system at block 592 may also include email service providers such as Gmail, Hotmail, and Yahoo Mail. The participant may select friends from his email address books maintained by these providers. Alternatively or additionally, the participant may simply type in friends' email addresses.

At block 593, the system receives the list of friends that the participant wishes to invite to enter the promotion or the email addresses of friends entered by the participant. The process continues at block 563 as described below.

If the participant clicked on a link within a social media-based platform (block 536—Yes), at decision block 540, the system determines whether the participant has previously downloaded the promotion application to the participant's social network profile. By downloading the promotion application, the web application server 112 is granted access to the participant's unique identifier as assigned by the social network server 108 and is then able to access the personal data contained in a participant's social media-based platform profile, subject to the social network's privacy and third party developer guidelines. In addition, the participant agrees to the terms and conditions and/or a privacy policy specified by the web application server that applies to the organization running the web application server. Because the web application server 112 stores each participant's unique identifier number in a participant database 116, only participants who have not previously downloaded the promotion application are required to do so.

If the participant has not previously downloaded the promotion application (block 540—No), at block 545, the system directs the participant to a webpage with the promotion application available for downloading. After the participant downloads the promotion application to the participant's social media profile, the system determines if the participant is eligible to enter the promotion at decision block 546. As described above, a participant is eligible to enter the promotion only if he has not exceeded a pre-set number of promotion entries or coupon downloads within a specified time period, where the number of entries or downloads and the time period are determined by the organization sponsoring the promotion. Because the participant is accessing the promotion via an application within a social network or via a service such as Facebook Connect that enables the system to access the social network profile data of the participant, the system can identify participants that have already entered or interacted with the promotion using the participant's social network identification. In contrast to the cookie method of determining the eligibility of a participant, greater security is provided by tracking participants through their social network identification because participants cannot edit or tamper with the recorded number of entries associated with the participant's identification. If a participant is determined ineligible to enter (block 546—No), the process ends at block 598. If a participant is eligible to enter (block 546—Yes), the process continues to block 555. In one embodiment, the participant may simply click on a promotion banner and enter the promotion without downloading the promotion application.

If the participant has previously downloaded the promotion application (block 540—Yes), at block 555, the system directs the participant to a webpage with a promotion entry form. The promotion entry form prompts the participant for information that may include, but is not limited to, name, email address, address, birth date, gender, zip code, country of residence, and custom survey questions provided by the organization. In one embodiment, the promotion entry form is pre-populated with information pulled directly from the participant's social network profile page. In one embodiment, the information pulled from the participant's social network profile page may be used to expedite or simplify the promotion entry process for the participant, whether or not a promotion entry form is used by the promotion. For example, in an instant win promotion, the participant's information may be used instead of requesting the participant to fill out a promotion entry form.

The promotion entry form also includes terms and conditions and/or a privacy policy that apply to the organization administering the promotion. The organization's terms and conditions and/or privacy policy may be different from those of the company running the web application server. By submitting the promotion entry form, the participant agrees to the organization's terms and conditions and/or privacy policy. After the participant fills out the promotion entry form and submits it, the system receives the information from the promotion entry form at block 560.

In one embodiment, a promotion may allow participants to upload participant-generated content including, but not limited to, videos, photos, artwork, and audio clips. Non-limiting examples of promotions that may allow uploading of participant-generated content include video contests, photo contests, and song contests. It should be noted that some social networks may not allow participant-generated content to be integrated into a particular social network's newsfeeds, minifeeds, or other viral features.

In one embodiment, a participant may increase his chances of winning a prize or increase the value of a given discount or other incentive by inviting friends within his social network to enter the promotion. At block 561, the participant is provided a list of the names of all friends in the participant's social network. The participant can then easily select which friends to invite to the promotion. At block 562, the system receives the participant's friends list.

If the organization is offering a coupon or voucher for participating in the promotion, at block 563 the relevant identifying information is pulled from the participant's social network profile data, included with the information on the coupon, and presented to the participant. Identifying information includes, but is not limited to, the participant's name, birth date, age, and a profile photo. The participant can print the coupon, email the coupon, or click directly to the organization's website to redeem the coupon.

At block 565, an invitation highlighting the prize, prizes, discounts or other incentives offered by the organization is automatically sent to the social network inbox of the selected friends. These friends can choose to accept the invitation which will direct them to the promotion entry form where they, too, can choose to invite friends from their social network.

At block 570, after the participant has completed entry into the promotion via the promotion application or the promotion widget, the system directs the participant to a promotion webpage that lists other promotions generated by the web application server 112 that are currently valid. In one embodiment, the participant is presented with a list of promotions that are matched or related to the interest and demographic information contained in the participant's social network profile data. In one embodiment, the participant is presented with a list of promotions that the participant's social network friends have recently entered and/or interacted with. This list may include specific information about the interactions that the participant's social network friends have had with the promotions, for example, it may display participant generated content that the participant's social network friends have recently uploaded to participant-generated content contests, or it may display the highest scores of the participant's social network friends who have recently interacted with games or quizzes. The participant may also choose to return to the original promotion (without having to re-enter the promotion entry form) to invite more friends to increase the participant's chances of winning a prize or increase the value of a given discount or other incentive. However, the rules of the promotion or social media-based platform running the promotion may limit a participant to entering the promotion no more than once a day or may limit the number of friends that can be invited daily.

In one embodiment, after the participant has completed entry into the promotion, the participant is directed to a custom banner that encourages the participant to visit the organization's website or social network webpage.

In one embodiment, the participant is automatically directed to the organization's website or social network page upon completing the entry process.

At block 575, the system automatically generates a newsfeed that may appear on the newsfeed page of the participant's social network friends. This newsfeed not only contains text telling readers about the promotion that their friend entered but may also contain graphical, audio, or video banners promoting the brand of the organization running the promotion and encouraging readers to enter the promotion. Readers can click on these banners or on the newsfeed text and they will be directed to the promotion entry form. In one embodiment, the system may also automatically generate minifeeds that appear in each participant's profile indicating that the participant has entered the promotion along with graphical, audio, or video mini-banners promoting the brand of the organization running the promotion. In one embodiment, other viral features of the social network may be used to spread the word about the organization and the promotion.

At decision block 580, the system determines whether a viewer has clicked on a mini-banner, a link in a newsfeed, a link in a friend invite, or any link to the promotion generated by a viral feature of the social media-based platform. If no participant has clicked on the mini-banner, newsfeed link, friend invite, or other viral feature link (block 580—No), the system returns to decision block 505 to await another's participant's interest in the promotion. If a participant does click on the mini-banner, newsfeed link, friend invite, or other viral feature link (block 580—Yes), the system returns to decision block 520 to determine whether the promotion is currently valid. The process continues as described above.

It will be apparent to a person skilled in the art that other types of promotions (e.g. sweepstakes, contests, instant win games, participant-generated content contests (including contests where the general public votes to determine the winner or winners), quizzes, games, company-branded games (including advergames), product sampling, and giveaways such as coupons and vouchers) may also be run with the online promotion technology, resulting in linking of these promotions with the viral features of social networks. For these different promotion formats, the online promotion would be customized according to the promotion's rules and unique features and still fall within the scope of this disclosure. For example, an instant win contest may be implemented such that a participant who fills out an entry form is immediately provided with an electronic scratch and win. In this case, the promotion rules may specify that the participant need not wait until the end of the promotion to be confirmed as a winner and to win a prize.

It will be apparent to a person skilled in the art that other versions of the online promotion technology may also be implemented. For example, white-label versions of the promotion technology may be provided that enable the organization to have more customized branding and features while still enabling the promotion to benefit from the core technology which integrates promotions with the viral features of social networks.

Embodiments of the invention described above enable organizations to run promotions that participants enter either within a social network or from outside of social media-based platforms and that take advantage of the viral power of social networks. By integrating promotions with the friend invite features, newsfeeds, minifeeds and other features that display online activities of users and people in the users' social network, and notifications, requests, and other social media-based platform features to deliver messages to members of the one or more social media-based platforms, organizations are enabled to run promotions that can be spread virally within the social networks. A participant entering a promotion that is integrated with a social media-based platform can, with a few easy clicks, invite their social network friends to enter the contest. In addition, a participant's friends will be able to read about the promotion on their social network newsfeed page as a result of the newsfeed that may be generated when someone enters a promotion that is run using the promotion technology. These are highly powerful ways for organizations to cost effectively spread the word about their promotions and their brands.

There are many possible compensation schemes through which an owner or administrator of the promotion technology may receive compensation including, but not limited to, generating promotion applications and providing related services. For example, the organization that wishes to run a promotion may be required to pay a flat fee for each promotion, the fee for the promotion may be proportional to the duration that the promotion is active, and/or a fee may be charged for each unique participant who enters the promotion. Alternatively or additionally, for the case of white-label versions of the promotion technology, a license may be granted to an organization for running one or more promotions. In one embodiment, an organization such as a marketing agency may choose to license the promotion technology to run one or more promotions for a third party organization's goods and/or services.

The above detailed description of examples of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having functions, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed in parallel, or may be performed at different times.

Various features are described which may be exhibited by some embodiments and not by others. Similarly, various requirements are described which may be requirements for some embodiments but not other embodiments.

The use of examples anywhere in this specification including examples of any terms discussed herein is illustrative only, and in no way limits the scope and meaning of the disclosure or of any exemplified term. Likewise, the disclosure is not limited to various embodiments given in this specification.

Although examples have been described with reference to specific exemplary embodiments, it will be evident that various modifications and changes can be made to these examples. Accordingly, the specification and drawings are to be regarded in an illustrative sense rather than in a restrictive sense.

What is claimed is:

1. A method comprising:
   accessing and harvesting profile information of users of a social media platform;
   receiving interest in an online promotion from a participant through an entry point;
   harvesting identification information from a social media profile of the participant based at least on the accessing;
   generating a personalized promotion for the participant containing at least some of the participant's identification information including securing the personalized promotion by providing a means for verifying integrity of the personalized promotion at a time for redemption wherein the means includes a verifiable portion of the participant's identification information obtained by the accessing; and
   distributing the personalized promotion to the participant, wherein the identification information on the personalized promotion provides a higher level of security and authenticity than promotions that do not contain such identification information.

2. The method of claim 1, further comprising:
   prompting the participant to provide a list of online social network contacts who can also interact with the online promotion; and
   automatically sending personalized invitations to enter the online promotion to the list of contacts provided by the participant.

3. The method of claim 1, further comprising receiving interest in the online promotion from a contact in the list of contacts and inviting the contact to provide a further list of social network contacts to interact with the online promotion.

4. The method of claim 1, wherein the invitations are sent to a network inbox of the contacts.

5. The method of claim 1, further comprising receiving design work for the online promotion.

6. The method of claim 1, wherein the social media platform enables generation and exchange of user-generated content.

7. The method of claim 1, wherein the social media platform includes viral features including one or more of newsfeeds, minifeeds or contact invites.

8. The method of claim 7, further comprising automatically displaying banners within the viral features of the social media platform when the participant enters the online promotion.

9. The method of claim 8, wherein the entry point includes one or more of:
   an organization's website;
   a widget, banner, or link within the social media platform;
   a widget, banner, or link on a webpage external to the social media platform; or
   a link generated by a viral feature of the social media platform.

10. The method of claim 9, wherein the social media platform is configured to transmit user activity information through the viral features within the social media platform.

11. The method of claim 1, further comprising directing the participant to download a promotion application to the participant's social network profile.

12. An article of manufacture comprising:
    a computer-readable medium having instructions stored thereon, which when executed by a processor on the computer, cause the computer to perform a method of disseminating online promotion campaigns, the instructions comprising:
    instructions for accessing and harvesting profile information of users of a social media platform;
    instructions for receiving interest in an online promotion from a participant through an entry point;
    instructions for harvesting identification information from a social media profile of the participant;
    instructions for generating a personalized promotion for the participant containing at least some of the participant's identification information including securing the personalized promotion by providing a means for verifying integrity of the personalized promotion at a time for redemption wherein the means includes a verifiable portion of the participant's identification information obtained by the accessing; and
    instructions for distributing the personalized promotion to the participant, wherein the identification information on the personalized promotion provides a higher level of security and authenticity than promotions that do not contain such identification information.

13. The article of manufacture of claim 12, further comprising:
    instructions for prompting the participant to provide a list of online social network contacts who can also interact with the online promotion; and
    instructions for automatically sending personalized invitations to enter the online promotion to the list of contacts provided by the participant.

14. The article of manufacture of claim 12, further comprising instructions for receiving interest in the online promotion from a contact in the list of contacts and instructions for inviting the contact to provide a further list of social network contacts to interact with the online promotion.

15. The article of manufacture of claim 12, wherein the invitations are sent to a network inbox of the contacts.

16. The article of manufacture of claim 12, further comprising instructions for receiving design work for the online promotion.

17. The article of manufacture of claim 12, wherein the social media platform enables generation and exchange of user-generated content.

18. The article of manufacture of claim 12, wherein social media platform includes viral features including one or more of newsfeeds, minifeeds or contact invites.

19. The article of manufacture of claim 18, further comprising instructions for automatically displaying banners within the viral features of the social media platform when the participant enters the online promotion.

20. The article of manufacture of claim 18, wherein the entry point includes one or more of:
    an organization's website;
    a widget, banner, or link within the social media platform;
    a widget, banner, or link on a webpage external to the social media platform; or
    a link generated by a viral feature of the social media platform.

21. The article of manufacture of claim 18, wherein the social media platform is configured to transmit user activity information through the viral features within the social media platform.

22. The article of manufacture of claim 12, further comprising instructions for directing the participant to download a promotion application to the participant's social network profile.

23. A web application server comprising:
a promotion generation module coupled with a network interface through a communications module, the promotion generation module configured to:
  access and harvest profile information of users of a social media platform;
  receive interest in an online promotion from a participant through an entry point;
  harvest identification information from a social media profile of the participant;
  generate a personalized promotion for the participant containing at least some of the participant's identification information including securing the personalized promotion by providing a means for verifying integrity of the personalized promotion at a time for redemption wherein the means includes a verifiable portion of the participant's identification information obtained by the accessing; and
  distribute the personalized promotion to the participant, wherein the identification information on the personalized promotion provides a higher level of security and authenticity than promotions that do not contain such identification information; and
a communications module configured to automatically send personalized invitations to enter the online promotion to a list of contacts provided by the participant.

24. The web application server of claim 23, wherein the promotion generation module is further configured to prompt the participant to provide a list of online social network contacts who can also interact with the online promotion, and the communications module is further configured to receive interest in the online promotion from a contact in the list of contacts.

25. The web application server of claim 24, wherein the promotion generation module further invites the contact to provide a further list of social network contacts to interact with the online promotion.

26. The web application server of claim 23, wherein the invitations are sent to a network inbox of the contacts.

27. The web application server of claim 23, wherein the social media platform enables generation and exchange of user-generated content.

28. The web application server of claim 23, wherein the social media platform includes viral features including one or more of newsfeeds, minifeeds or contact invites.

29. The web application server of claim 28, wherein the entry point includes one or more of:
  an organization's website;
  a widget, banner, or link within the social media platform;
  a widget, banner, or link on a webpage external to the social media platform; or
  a link generated by a viral feature of the social media platform.

30. The web application server of claim 29, wherein the social media platform is configured to transmit user activity information through the viral features within the social media platform.

31. The web application server of claim 23, further comprising directing the participant to download a promotion application to the participant's social network profile.

32. The web application server of claim 23, further comprising a data collection and analysis module to harvest information for marketing and branding through the online promotion.

* * * * *